March 8, 1955
H. S. ROSENBAUM
2,703,447
CORD AND TAPE CUTTER AND METHOD
Filed Feb. 21, 1952
4 Sheets-Sheet 2
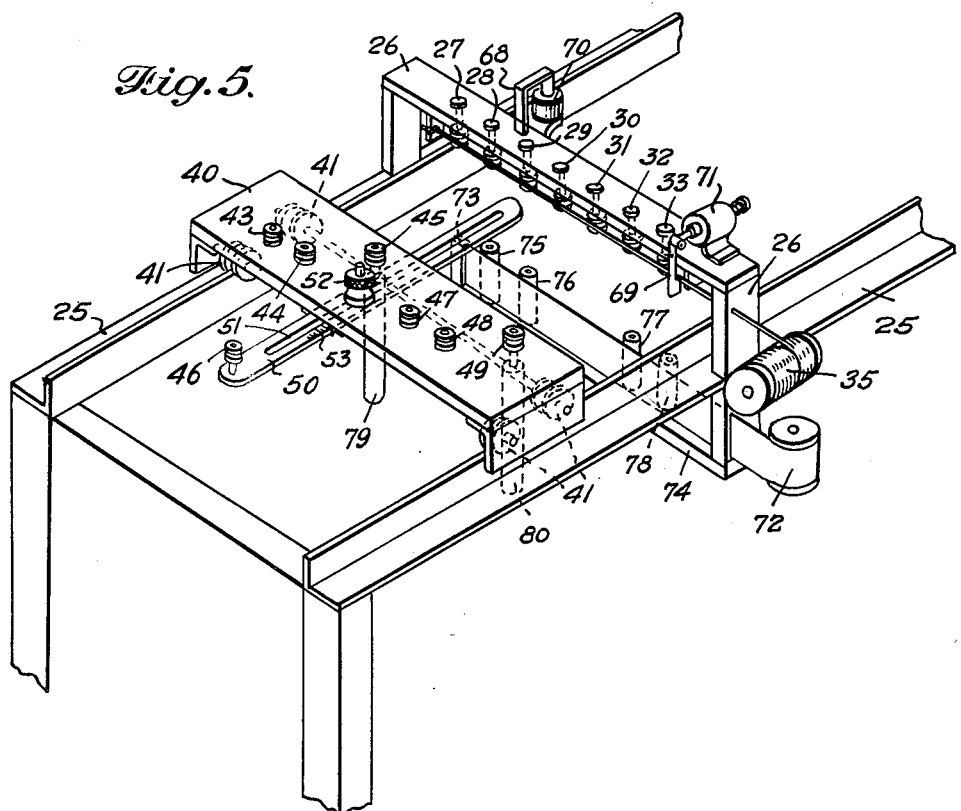
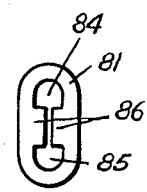
Fig. 6.
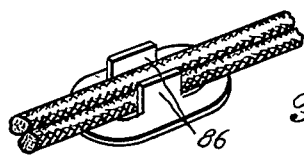
Fig. 7.
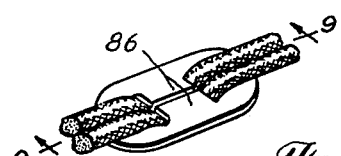
Fig. 8.
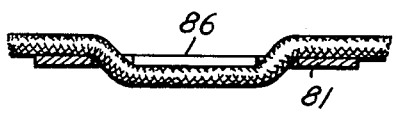
Fig. 9.
INVENTOR
Harry S. Rosenbaum
BY Karl W. Flocks
ATTORNEY INVENTOR
Harry S. Rosenbaum
BY Karl W. Flocks
ATTORNEY

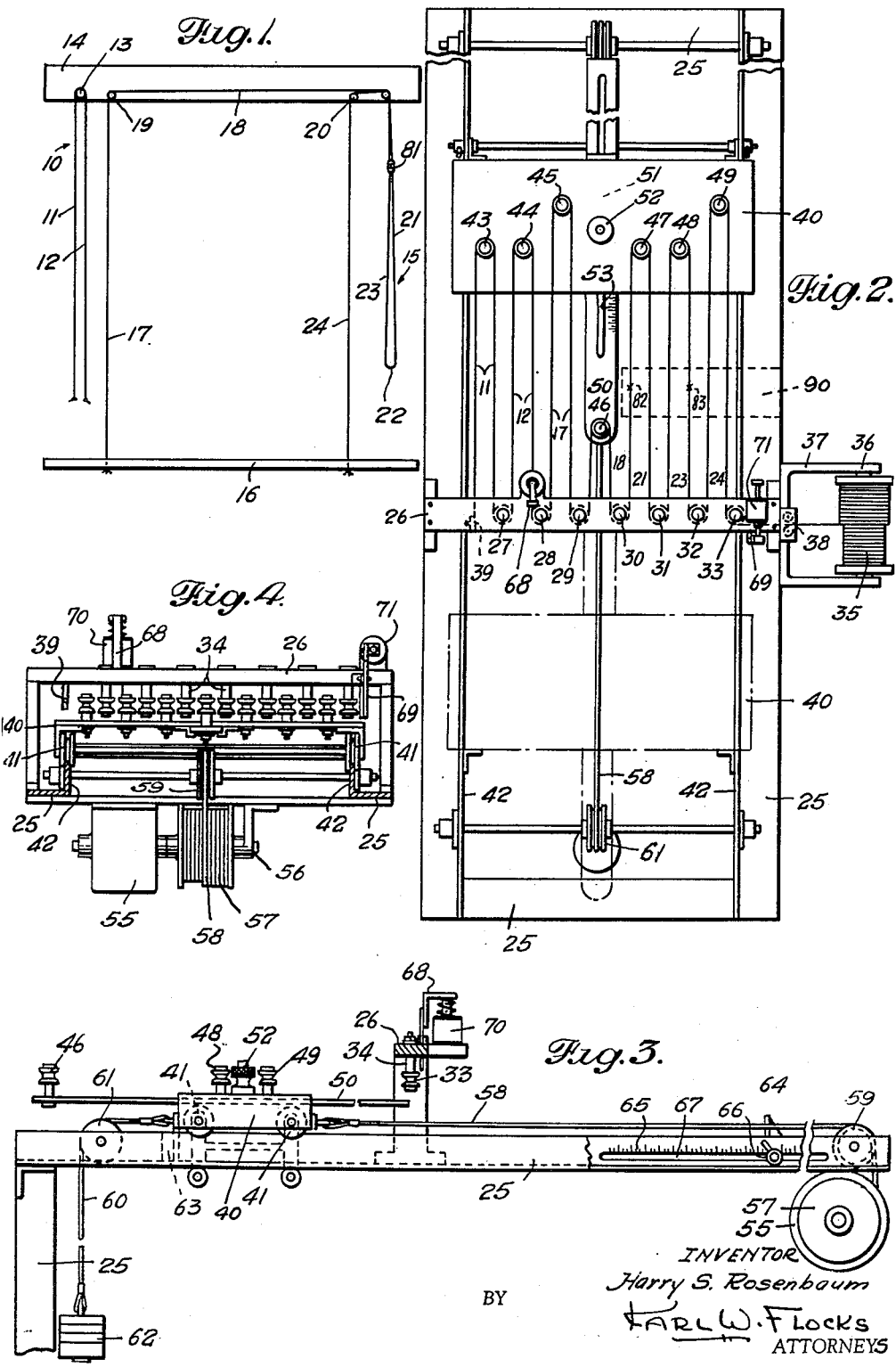

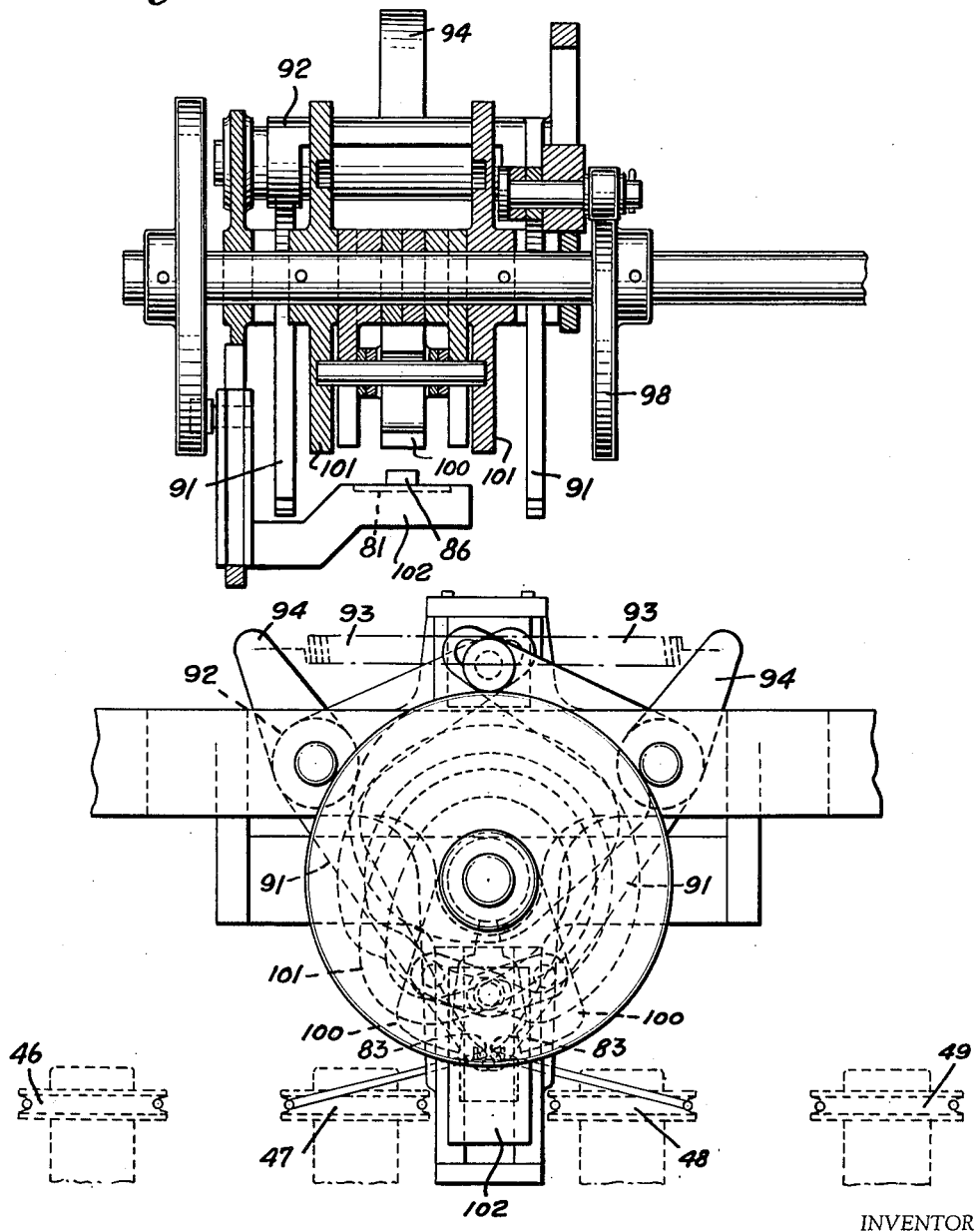

United States Patent Office 2,703,447
Patented Mar. 8, 1955

2,703,447

CORD AND TAPE CUTTER AND METHOD

Harry S. Rosenbaum, Baltimore, Md., assignor to The Eastern Venetian Blind Company, Baltimore, Md., a corporation of Maryland Application February 21, 1952, Serial No. 272,860

12 Claims. (Cl. 29—428)

This invention relates to apparatus for measuring lengths of cord and tapes and more particularly to apparatus for automatically measuring cords and tape ladders of the proper length for use on Venetian blinds of a given size.

In the past it has been customary when assembling a Venetian blind of a given length and width to first compute the length of cord required for the lift cord and the tilt cord, and then to measure off these lengths and cut off the required lengths of cord. Since the amount of cord required for different widths and lengths of blinds adapted to fit various dimensional openings varies, it is a difficult problem to compute the exact length of cord required and, in addition, it is time-consuming to manually measure off accurately the required number of feet of cord.

It is an object of the present invention to provide apparatus which automatically computes, measures and cuts off the correct length of cord and tape ladder for a Venetian blind of a given length and width.

It is a further object of the present invention to provide apparatus which automatically computes, measures and cuts off the correct length of cord and tape ladder for a Venetian blind of a given length and width by merely setting two stops to correspond to the length and width of the blind.

It is a still further object of the present invention to provide apparatus for assembling an equalizer on a piece of cord of the proper length for a lift cord for a Venetian blind in its proper position before assembling the blind.

It is another object of the present invention to provide an improved equalizer for a Venetian blind cord that can be assembled onto the Venetian blind cord before it is assembled into the Venetian blind.

Other objects and the nature and advantages of the instant invention will be apparent from the following description taken in conjunction with the accompanying drawings, wherein:

Fig. 1 is a side elevation showing a lift cord and tilt cord assembled to a head rail and bottom rail of a Venetian blind with the tapes and slats omitted;

Fig. 2 is a plan view of the apparatus showing the device in the operative position in full lines and in the inoperative position in dotted lines;

Fig. 3 is a side elevation of the apparatus showing the device in the inoperative position;

Fig. 4 is an end elevation of the apparatus,

Fig. 5 is a perspective view of the apparatus in the inoperative position showing an attachment thereon for likewise measuring the lengths of tape ladders required;

Fig. 6 is a plan view of the equalizer;

Fig. 7 is a perspective view of the equalizer in process of being assembled to the cord;

Fig. 8 is a perspective view of the assembled equalizer and cord;

Fig. 9 is a sectional view taken along the line 9—9 of Fig. 8;

Fig. 12 is a sectional view taken along the line 12—12 of Fig. 10; and

Fig. 13 is a front elevation of the apparatus for assembling the equalizer shown in closed position.

Figure 10:
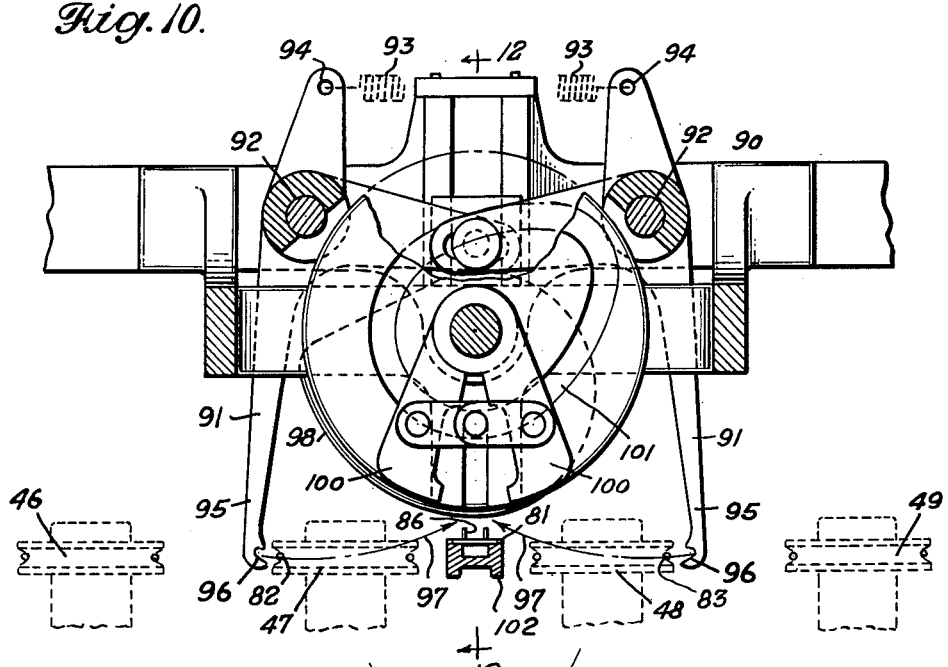
Fig. 10 is a front elevation, partly in section, of the apparatus for assembling the equalizer in open position.
Figure 11:
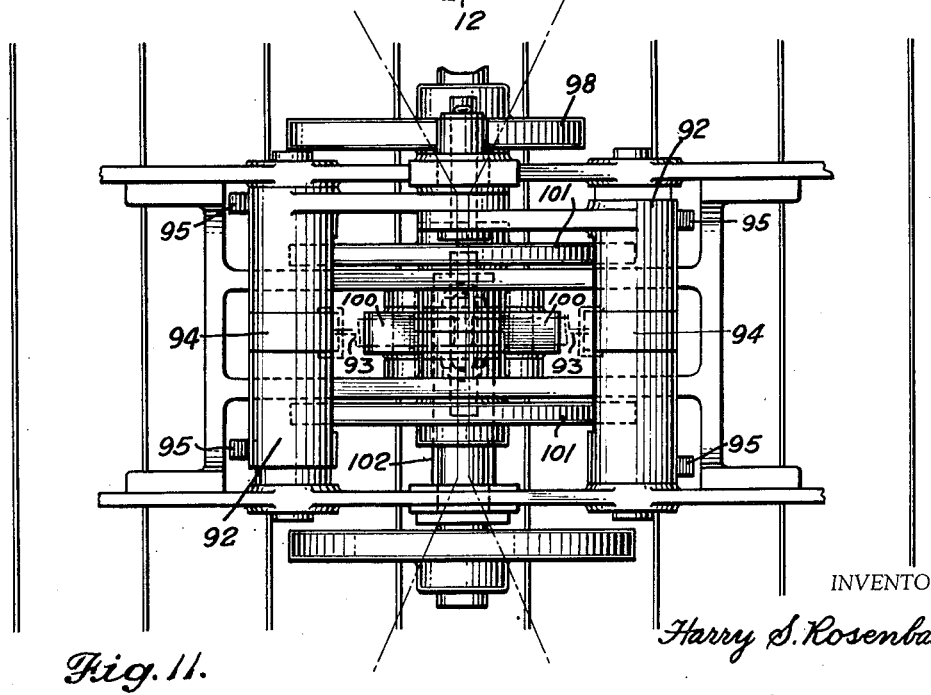
Fig. 11 is a top plan view of the apparatus shown in Fig. 10.

As illustrated in Fig. 1, the tilt cord 10 of the Venetian blind is shown as including lengths of cord 11 and 12, each length of which extends downwardly from a pulley 13 mounted on the head bar 14 to a point somewhat above the bottom rail 16 of the blind. The lift cord 15 is attached at each end to the bottom rail 16. Following the lift cord 15 from one end thereof to the other, it includes length 17 extending from the bottom bar to the head rail, length 18 extending from pulley 19 to pulley 20 in the head rail, length 21 extending from pulley 20 to the point 22 at which the cord is doubled, length 23 extending from point 22 to pulley 20 and length 24 which extends from pulley 20 to the bottom rail. Thus, it will be seen that lengths of cord 17 and 24 correspond to the length of the Venetian blind and, likewise, the length of tape ladder required, whereas the length of cord 18 corresponds in general to the width of the blind.

It should be noted that length of cord 18 extends from the location of one tape ladder to the location of the other tape ladder. Since the tape ladders in a two-tape ladder Venetian blind are generally located near the outer ends of the blind (approximately six inches from each end), the length of cord 18 does not exactly equal the width of the blind, but is in reality approximately twelve inches less than the width of the blind. The length 18 will be described herein as corresponding to the width of the blind.

On the other hand, the length of the tilt cord 10 is approximately equal to the length of the doubled portion of the lift cord which includes lengths 21 and 23. The apparatus in accordance with the present invention automatically measures off a length of cord equal to the combined lengths of the lift cord and the tilt cord, and then cuts the cord at the proper points to yield two cords, one of the proper length to serve as the lift cord and the other of the proper length to serve as the tilt cord for the particular size of Venetian blind to be assembled.

To summarize, the total cord used in the assembly of a blind of a given size includes two lengths (17 and 24) equal to the length of the blind, four lengths (11, 12, 21 and 23) somewhat shorter than the length of the blind, and a seventh length (18) corresponding to the width of the blind.

The apparatus as shown in the drawings for accomplishing the above objectives is mounted on supporting frame members 25 which form a supporting table. Rigidly attached to the frame members is a stationary horizontal plate 26 which is shown to extend across the frame members slightly elevated therefrom. Seven free-running grooved pulleys 27, 28, 29, 30, 31, 32 and 33 extend downwardly from plate 26 and are attached thereto by means of supports 34. These pulleys are arranged in a straight line across the plate and are equally spaced. A spool of cord 35 is mounted on the right side of the machine, mounted on a shaft 36 so that it is free to revolve on the shaft. The shaft is mounted on a bracket 37 which is in turn attached to one of the frame members 25. A pair of guide pulleys 38 mounted on vertical shafts in close proximity serve to guide the cord in passing from the spools 35 across the apparatus adjacent to the seven stationary pulleys to a cord gripper 39 mounted on the underside of the left side of the plate 26, which gripper is adapted to hold the free end of the cord firmly.

A movable plate 40 adapted to travel with respect to the stationary plate from a point located on one side thereof to a point located on the other side thereof by passing beneath the stationary plate 26 is provided with wheel assemblies 41 which travel along tracks 42 extending the length of the apparatus. As indicated in Fig. 4, the tracks 42 may be integral with the frame members 25.

Mounted on the top of movable plate 40 are seven pulleys 43, 44, 45, 46, 47, 48 and 49 staggered in a definite pattern in a longitudinal direction but equally spaced in a lateral direction. Pulleys 43, 44, 47 and 48 are mounted in the same lateral line. Pulleys 45 and 49 are likewise located along a common lateral line. Pulley 46 is adjustably mounted on the movable plate 40 and the position of this pulley is used to regulate the width of the blind to be assembled. Pulley 46 is mounted on a movable arm 50 that extends below plate 40 and can be longitudinally adjusted with respect to the movable plate 40. A slot 51 extends longitudinally along plate 40 and a locking screw 52 extends through slot 51 and is used to lock the arm 50 into the desired position. Graduations 53 are provided along the top surface of arm 50 to assist in setting the pulley 46 at the proper point corresponding to the width of the blind.

The pulleys on the movable plate 40 are so positioned that they are in the same horizontal plane as the pulleys depending from the stationary plate 26, and are staggered with relation thereto so that each pulley on the movable plate is adapted to pass between the pulleys on the stationary plate when the movable plate travels thereunder.

The movable plate 40 can be moved manually or may be actuated by means of a motor 55 which rotates the shaft 56 of a drum 57. The motor 55 and drum 57 are mounted beneath the frame members 25. A cable 58 is attached to drum 57 and thence passes over pulley 59 on the upper side of frame member 25 and thence to the movable plate 40. Rotation of the drum 57 by means of the motor 55 winds up the cable 58 and thus draws the movable plate along its tracks 41 and 42. A cable 60 is attached to the other side of the movable plate 40 and extends over pulley 61 and thence downward. A counterweight 62 is attached to the end of cable 60. The counterweight 62 is utilized to return the movable plate 40 to its inoperative position adjacent to stop member 63 after the measuring and cutting operation has been completed. The extent of travel of the movable platform is controlled by means of an adjustable stop member 64 that is set at the proper point determined by the graduations 65 on the side of the apparatus. The stop member 64 is set by means of a knob 66 travelling in a slot 67. The adjustment of the setting of the stop member 64 to control the extent of travel of the movable platform is used to set the apparatus, depending on the length of Venetian blind to be assembled.

Adjacent to pulleys 28 and 33 are cutting knives 68 and 69 which can be actuated by solenoids 70 and 71 to sever the cord in two places.

The operation of the apparatus is as follows: After determining the length and width of Venetian blind to be assembled, the locking screw 52 is loosened and the arm 50 is set in the position on the graduations 53 corresponding to the width of the blind to be assembled. The locking screw 52 is then tightened. Adjustable stop member 64 is then set along graduations 65 to correspond to the length of the blind to be assembled. The cord is then drawn across the device from the freely revolving spool 35 to the cord gripper 39 where it is held firmly. The motor 55 is next actuated to drive the movable plate 40 along its tracks 41 and 42. The pulleys on the movable plate 40 first engage the cord stretched across the apparatus and carry it between the pulleys on the stationary plate 26 while unreeling the cord from the spool 35. The cord is interrupted by the pulleys on the stationary plate 26 to form loops in the cord as shown in Fig. 2. When the stop has been reached, the cutters 68 and 69 are actuated. After the motor has cut off and the cutters actuated, the counterweights return the movable plate to the inoperative position.

The loop extending from the cord gripper 39 around pulley 43 and to pulley 27, as shown in Fig. 2, corresponds to the length of cord 11 in Fig. 1, and the loop extending from pulley 27 around pulley 44 and back to pulley 28 corresponds to length of cord 12. Thus, when the cord is cut adjacent to pulley 28 by cutter 68, the length of cord from the cord gripper 39 to the cut-off point corresponds to the length of the tilt cord 10. Likewise, the loop extending from pulley 28 around pulley 45 and back to pulley 29 corresponds to the length of cord 17. The loop extending from pulley 29 around pulley 46 and back to pulley 30 corresponds to length of cord 18. The loop extending from pulley 30 around pulley 47 and back to pulley 31 corresponds to length of cord 21. The loop extending from pulley 31 around pulley 48 and back to pulley 32 corresponds to length of cord 23. The loop of cord extending from pulley 32 around pulley 49 and back to pulley 33 corresponds to length of cord 24. Thus, the total length of cord from cutter 68 to cutter 69 is identical to the length of the tilt cord 15.

The resulting configuration of seven loops, as best shown in Fig. 2, includes two loops 17 and 24 which correspond to the length of the blind to be assembled, four loops 11, 12, 21 and 23 which are of equal length and somewhat shorter than the two loops 17 and 24, and a seventh loop 18 which corresponds to the width of the blind to be assembled. This configuration is attained for any size of Venetian blind to be assembled by two adjustments. The length of loops 17 and 24 is adjusted to the length of the blind to be assembled by controlling the extent of travel of the movable plate so that pulleys 45 and 49 thereon travel a distance beyond the pulleys on the stationary plate corresponding to one-half the length of the blind to be assembled. This adjustment is indicated by means of graduations 65. The second adjustment is made by shifting the position of pulley 46 longitudinally with respect to plate 40 so that at the end of the travel of plate 40, as set by the first adjustment, pulley 46 has travelled a distance beyond the stationary pulleys corresponding to approximately one-half of the width of the blind to be assembled. This is readily accomplished by means of graduations 53 on the apparatus. The pulleys are so arranged as shown in Fig. 2, that two of the four loops of equal size are on the left side and result in the tilt cord. The longer loops 17 and 24 are located as the third loop from the left and the last loop on the right. The adjustable loop is located at the center.

Thus, to assemble a blind 30″ wide and 60″ long, the extent of travel of the movable plate would be adjusted so that pulleys 45 and 49 move 30″ (one-half the length of the blind) beyond the stationary plate pulleys. Pulley 46 would be set 21″ from pulleys 45 and 49, so that pulley 46 would travel 9″ beyond the stationary pulleys to give a loop 18″ long. This would correspond to the width of the blind, being 12″ less than the actual width thereof, or the distance between the two tape ladders of the blind to be assembled.

If desired, the tape ladders can be measured simultaneously with the measurement of the cord. As shown in Fig. 5, the roll 72 of the tape ladder is mounted under the spool of cord 35 and is adapted to be stretched across the apparatus under the movable plate 40 and attached at the left end to a gripping member 73. A second stationary plate 74 is mounted under the stationary plate 26 at a level below the movable plate 40. Four rollers 75, 76, 77 and 78 are mounted in a row on plate 74, located directly below stationary pulleys 28, 29, 32 and 33, respectively, on the stationary plate 26. Directly beneath pulleys 45 and 49 on the movable plate are depending rollers 79 and 80 which depend from the movable plate and move therewith.

Thus, when the movable plate travels along tracks 42 between the stationary plates 26 and 74, the rollers 79 and 80 first engage the tape ladder stretched across the apparatus and carry it between the rollers on the plate 74 while unreeling additional tape from the roll 72. The tape is intercepted by the rollers on the stationary plate 74 to form two loops in the cord having the same configuration as the cord loops 17 and 24. Cutters, not shown, may be provided to cut the tape ladder at a point between rollers 76 and 77 and adjacent to roller 78 to form two equal lengths of cord of the proper length for use on the Venetian blind to be assembled.

As shown in Fig. 1, an equalizer 81 it attached to the lift cord 15 at the point indicated and serves to hold the lengths of cord 21 and 23 in relative position so that the two sides of the blind will rise equally as the lift cord is actuated. Heretofore, the equalizer has consisted of a piece of material having a pair of openings through which the double strand of cord beginning at point 22 is inserted and pulled through until the equalizer is at the proper height. According to the present invention, the position on lengths of cord 21 and 23 where the equalizer is to be placed can be determined directly from the apparatus described, and the equalizer can be readily assembled to the cord by the apparatus to be described hereinafter. Points 82 and 83 on the lift cord, as shown in Fig. 2, correspond to the points on the cord where the equalizer is to be finally located. These parts are easily determined since the equalizer is located approximately one-quarter of the distance between pulley 20 and the doubling point 22 on cord 21 and also approximately three-quarters of the distance from the point 22 and the pulley 20 and cord 23. The distance of one-quarter of length 21 corresponds to a point approximately half way between pulleys 30 and 47 on the apparatus (point 82) and the distance of three-quarters of length 23 corresponds to a point approximately half way between pulleys 48 and 32 on the apparatus (point 83). These points can be readily determined on the cord and, if desired, an equalizer of the type described herein can be readily assembled manually onto the cord utilizing a hand tool, without threading the entire cord therethrough to the proper position.

The equalizer 81, in accordance with this invention, is punched from a sheet of material, such as metal or any other suitable ductile material that can be bent without snapping off. The equalizer blank is provided with two cut-out portions 84, 85, at each end thereof separated by a pair of tabs 86 extending inwardly from opposite sides of the equalizer to a point near the center thereof. The two tabs 86 are bent at 90° to the plane of the equalizer as shown in Fig. 7. In use, the doubled cord is placed between the upstanding tabs 86 over the body of the equalizer 81 and the tabs are then bent downward until they are in the same plane as the equalizer body as shown in Fig. 8. The cords then pass over the equalizer body on the left, under the tabs at the center and over the equalizer body at the right. In this manner, the cords are properly positioned relative to one another at the predetermined locations 82, 83.

Utilizing the apparatus illustrated in Figs. 10 through 13, the equalizer can be automatically assembled at the proper position on the cords. This apparatus is merely illustrative of a large number of devices than can be used for this purpose and made a part of the measuring and cutting apparatus heretofore described. The apparatus for assembling the equalizer onto the cord is diagrammatically shown in Fig. 2 at 90. Apparatus 90 can be movably mounted onto the frame 25 so that its position can be adjusted to conform to the points 82 and 83. Apparatus 90 is mounted above the frame 25 in such a manner that the movable plate 40 and its pulleys 47 and 48 can pass beneath it. Apparatus 90 includes a pair of depending arms 91, each of which is pivoted at point 92 near the upper end of the arm. A spring 93 is attached to the upper end 94 of each arm 91 in such a manner that the lower end 95 of each arm is normally held in the open position, as shown in Fig. 10. A hook 96 is provided at the lower end 95 of each arm which is located in the same horizontal plane as pulleys 47 and 48 when in the open position. When the arms 91 are actuated to the closed position (Fig. 13), their lower ends 95 travel in the path shown by arrows 97 in Fig. 10. The arms 91 are actuated by means of a cam 98, best shown in Fig. 13. When the arms 91 close, each hook 96 contacts the cord at points 82 and 83, respectively, and conveys the cord inwardly and upwardly over the adjacent portion of the cord located between points 82 and 83, until the points 82 and 83 are adjacent to one another as shown in Fig. 13.

A second pair of depending arms 100 are actuated by cams 101 to move from the open position shown in Fig. 10 to a closed position, which is not shown. An equalizer feeder 102 is located directly below arms 100 and acts to feed an equalizer 81 upward to a position so that the upstanding tabs 86 of the equalizer are between the arms 100. When the arms 100 are closed, they contact the tabs 86 of the equalizer and bend each tab inwardly to a horizontal position.

In operation, after the movable plate 40 has travelled to stop 64, the two arms 91, located one-half the distance between stationary pulleys 30 and 32 and movable pulleys 47 and 48, are then actuated. In moving together, hooks 96 engage the cord at points 82 and 83 and bring these points upwardly and inwardly until points 82 and 83 are in contact with one another. The feeder 102 then feeds an equalizer 81 upwardly until the tabs 86 are located on each side of the points 82 and 83, as shown in Figs. 7 and 13. Arms 100 are then closed, forcing the tabs 86 into the horizontal position, as indicated in Fig. 8. The arms 91 and 100 and feeder 102 are then retracted, and the operation is completed.

It should be pointed out that although this apparatus is being described for use in measuring Venetian blind cords and tape ladders, it is applicable to the measurement of specified lengths of any type cord, ribbon, tape, fabrics or the like for use for any purpose.

It will be obvious to those skilled in the art that various changes may be made without departing from the spirit of the invention and therefore the invention is not limited to what is shown in the drawings and described in the specification but only as indicated in the appended claims.

What is claimed is:

1. In an apparatus for automatically measuring cords to the proper length for use as lift cords and tilt cords for Venetian blinds of various sizes, a stationary plate, a plurality of freely revolving pulleys attached thereto, said pulleys being arranged in a row and spaced apart, a freely revolving spool containing the cord to be measured mounted at one side of the apparatus, a cord gripper mounted at the other side of the apparatus and opposite said spool, said spool and said cord gripper being so positioned that when said cord is stretched from said spool to said gripper the cord is adjacent to said stationary plate pulleys, a movable plate adapted to reciprocate with respect to said stationary plate and travel from a point located on one side thereof to a point located on the other side thereof, a plurality of freely revolving pulleys attached to said movable plate located in the same horizontal plane as said stationary plate pulleys, said pulleys on said movable plate being spaced apart in such a manner that each pulley on said movable plate travels between the pulleys on the stationary plate when the movable plate traverses its path, whereby when the cord has been stretched across the apparatus and the movable plate traverses its path, the stretched cord is contacted by each of the pulleys thereon, unwound from its spool, and carried to the extent of travel of said plate resulting in the cord being arranged in loops alternately about a movable plate pulley and then a stationary pulley.

2. In an apparatus in accordance with claim 1, an adjustable stop adapted to control the length of travel of the movable plate and thereby control the length of cord measured off to correspond with the length of the blind to be assembled.

3. In apparatus in accordance with claim 1, means for attaching one of said pulleys on the movable plate adjustably longitudinally with respect to the remaining pulleys on said plate to thereby vary the length of cord measured off to correspond to the width of the blind to be assembled.

4. In apparatus in accordance with claim 2, means for atttaching one of said pulleys on the movable plate adjustably longitudinally with respect to the remaining pulleys on said plate to thereby vary the length of cord measured off to correspond to the width of the blind to be assembled.

5. In apparatus in accordance with claim 1, means for cutting said cord in two places after the measurement thereof to form a pair of cords of proper length to be used as the lift cord and tilt cord respectively of the Venetian blind.

6. In apparatus in accordance with claim 1, means for determining two points on said looped cord, said points being the place at which a cord equalizer for the Venetian blind is to be attached.

7. In apparatus in accordance with claim 1, means for contacting the stretched cord at two predetermined points on non-adjacent loops and bringing said two points adjacent one another and means for assembling a cord equalizer on said cord at said adjacent points.

8. In apparatus in accordance with claim 7, wherein said first named means includes a pair of pivoted depending arms in the plane of said stretched cord adjacent the two predetermined points, said arms being adapted to engage said points on the cord when in the outstretched position and to pivot to a closed position adjacent one another, thus bringing the predetermined points adjacent one another.

9. In apparatus in accordance with claim 3, seven pulleys being mounted on said stationary plate, and seven pulleys being mounted on said movable plate, so that in the operative position seven loops of cord are formed, the pulleys on said movable plate being so staggered that four of said loops are of equal length, two of said loops are of equal length and somewhat longer than said four loops, and the remaining loop is of adjustable length, whereby two adjacent loops of said four loops serve as the tilt cord, the remaining five adjacent loops serving as the lift cord with the adjustable loop being of a length corresponding to the width of the Venetian blind to be assembled.

10. In an apparatus for automatically measuring lift cords, tilt cords and tape ladders of the proper length for use on Venetian blinds of various sizes, a first stationary plate, a plurality of freely revolving stationary pulleys attached thereto, said pulleys being arranged in a row and spaced apart, a spool containing the cord to be measured mounted at one side of the apparatus, a cord gripper mounted at the other side of the apparatus and opposite said spool, said spool and said cord gripper being so positioned that when said cord is stretched from said spool to said gripper the cord is adjacent to said stationary pulleys, a second stationary plate mounted directly below said first stationary plate, a plurality of stationary rollers attached to said second stationary plate, a roll containing the tape ladder to be measured mounted under said spool of cord, a tape gripper mounted at the other side of the apparatus and opposite said roll, said roll and said tape gripper being so positioned that when said tape ladder is stretched from said roll to said gripper the tape ladder is adjacent to said stationary rollers, a movable plate adapted to reciprocate with respect to said stationary plates and travel from a point located on one side of said plates to a point located on the other side thereof, said movable plate passing between said stationary plates in its travel, a plurality of pulleys attached to said movable plate extending upwardly therefrom, said pulleys being in the same horizontal plane as said stationary pulleys and being spaced apart such that each pulley on the movable plate travels between the stationary pulleys when the movable plate traverses its path, a plurality of rollers on said movable plate extending downwardly therefrom, said rollers being in the same horizontal plane as said stationary rollers and being spaced apart such that each said roller on the movable plate travels between a pair of rollers on the stationary plate as the movable plate traverses its path, whereby when the cord and tape ladder have been stretched across the apparatus and the movable plate traverses its path, the stretched cord is contacted by each of the pulleys thereon and the stretched tape ladder is contacted by each of the rollers thereunder and both the cord and tape ladder are carried to the extent of travel of the plate resulting in their being arranged in loops alternately about a movable plate pulley or roller and then a stationary pulley or roller.

11. A method of automatically measuring cords to the proper length for use as lift cords and tilt cords for Venetian blinds of various sizes, comprising extending a continuous cord from a freely accessible source of supply across a horizontal path in contact with one side of a plurality of fixed members, attaching the end of the cord to the end of the horizontal path opposite to the source of supply, moving a plurality of second members from one side of the fixed members to a point on the other side of the fixed members so that each second member passes between a pair of fixed members and engages the cord extending therebetween to form a loop of cord of predetermined length, and cutting the cord at at least one predetermined point to form pieces of cord of predetermined lengths.

12. A method in accordance with claim 11, wherein prior to the cutting step, two points on one of said cords which are separated from each other by at least one loop of cord are brought together and attached to one another.

References Cited in the file of this patent

UNITED STATES PATENTS

| Number | Name | Date |
|---|---|---|
| 1,070,389 | Beck | Aug. 19, 1913 |
| 1,289,178 | Howell | Dec. 31, 1918 |
| 1,625,725 | Irvin | Apr. 19, 1927 |
| 2,015,981 | Welfield | Oct. 1, 1935 |
| 2,024,880 | Rydquist | Dec. 17, 1935 |
| 2,036,787 | Zabriskie | Apr. 7, 1936 |
| 2,236,876 | Jablon | Apr. 1, 1941 |
| 2,264,161 | Hammer | Nov. 25, 1941 |
| 2,264,162 | Hammer | Nov. 25, 1941 |
| 2,388,875 | Skinner | Nov. 13, 1945 |
| 2,438,034 | Brugger | Mar. 16, 1948 |
| 2,438,101 | Wright | Mar. 16, 1948 |
| 2,571,678 | Burns | Oct. 16, 1951 |